No. 763,593. PATENTED JUNE 28, 1904.
C. CANCLINI.
CULINARY UTENSIL.
APPLICATION FILED SEPT. 19, 1903.
NO MODEL.
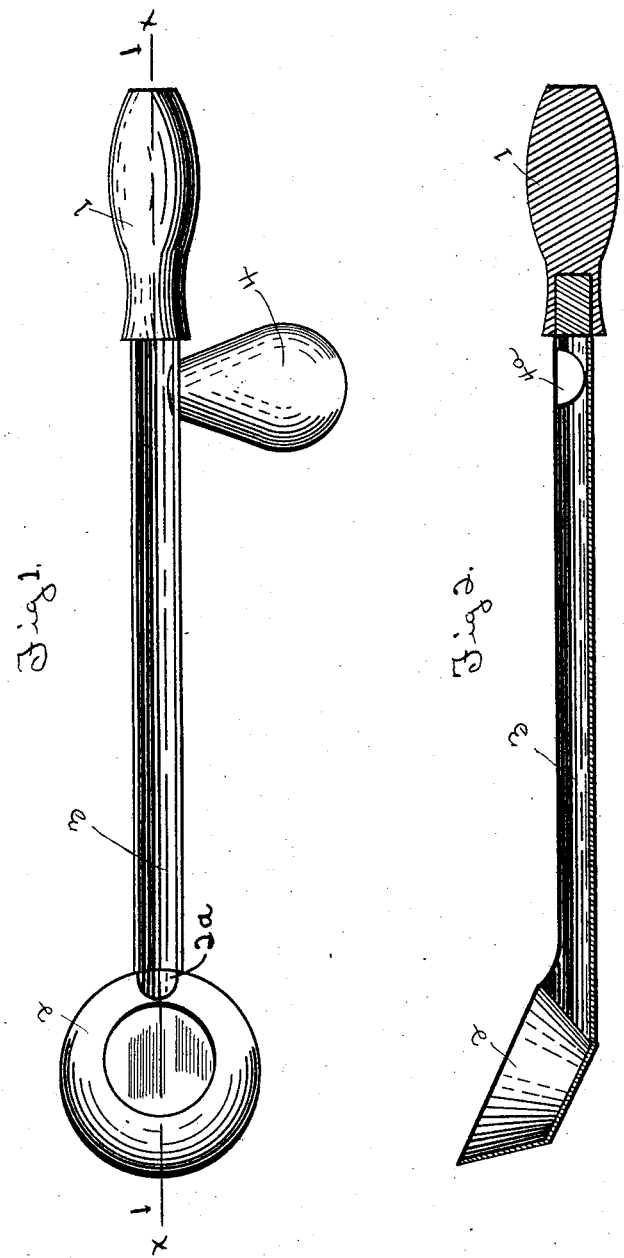
Witnesses
Percy S. Webster.
H. L. Davidson.
Inventor
Charles Canclini
By Joshua B. Webster
Attorney No. 763,593. Patented June 28, 1904.

UNITED STATES PATENT OFFICE.

CHARLES CANCLINI, OF SONORA, CALIFORNIA.

CULINARY UTENSIL.

SPECIFICATION forming part of Letters Patent No. 763,593, dated June 28, 1904.

Application filed September 19, 1903. Serial No. 173,883. (No model.)

*To all whom it may concern:*

Be it known that I, CHARLES CANCLINI, a citizen of the United States, residing at Sonora, in the county of Tuolumne, State of California, have invented certain new and useful Improvements in Culinary Utensils; and I do declare the following to be a full, clear, and exact description of the invention, such as will enable others skilled in the art to which it appertains to make and use the same, reference being had to the accompanying drawings, and figures of reference marked thereon, which form a part of this specification.

My invention relates to certain improvements in culinary utensils, or more particularly to that class designated as "ladles." My object is to produce a utensil by means of which the food or other liquid to be sampled during the process of cooking may be cooled without blowing.

Another object is to do away with the repulsive habit of cooks of replacing into the food the spoon used in sampling the same.

These objects I accomplish by use of a trough or groove in the handle of the ladle, which opens into the cup thereof and which has a spoon suitably arranged at its upper end and such devices and combination of devices as will be more fully set forth in the following specification and pointed out in the claims hereunto annexed, reference being had to the accompanying drawings for a better understanding thereof, in which—

Figure 1 is a top plan elevation of my improved culinary utensil. Fig. 2 is a side elevation showing in section through a line X X of Fig. 1.

Similar numerals of reference indicate corresponding parts in both views.

1 is the handle of my improved culinary utensil.

2 is a cup connected with the extension of the handle 1.

$2^a$ is an aperture opening from cup 2 into extension 3 of handle 1.

3 is a grooved or trough-shaped extension of the handle 1, connected with the cup 2 by means of the aperture $2^a$.

4 is a spoon at head of grooved extension 3 and is connected therewith by means of aperture $4^a$.

The mode of operating my improved culinary utensil is as follows: The operator grasps the handle 1 and dips up some of the liquid to be tasted into the cup 2. He then brings the ladle to a horizontal position, and the liquid runs through the aperture $2^a$ into the groove or trough of the handle 3 and along said groove and through the aperture $4^a$ into the spoon 4. By the time it reaches the spoon 4 it is sufficiently cooled so that the operator may taste it. When he again puts the ladle into the kettle, the same spoon that he has had to his mouth does not touch the liquid at all.

In practice the aperture $2^a$ may be covered with any suitable screen in order to prevent any particles of food from entering and clogging the trough 3.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claims.

Having thus described my invention, what I claim is—

1. A utensil for sampling purposes comprising a grooved handle extension carrying a cup at its forward end and a spoon at its opposite end communicating with the cup through said grooved handle.

2. A utensil for sampling purposes comprising a hollow handle extension having a cup at its one end, and a spoon extending transversely to the handle at its other end, the cup and spoon being in communication through the handle.

3. A utensil for sampling purposes comprising a handle extension, a handle secured to one end thereof, and a cup on the other end, and a spoon extending outwardly from the handle extension, and in communication with the cup.

In testimony whereof I affix my signature in presence of two witnesses.

CHARLES CANCLINI.

Witnesses:
JOSHUA B. WEBSTER,
STELLA ANDERSON.